May 29, 1928. 1,671,542
G. W. PERKS
MEASURING AND DISPENSING ATTACHMENT FOR BOTTLES
Filed Sept. 30, 1927
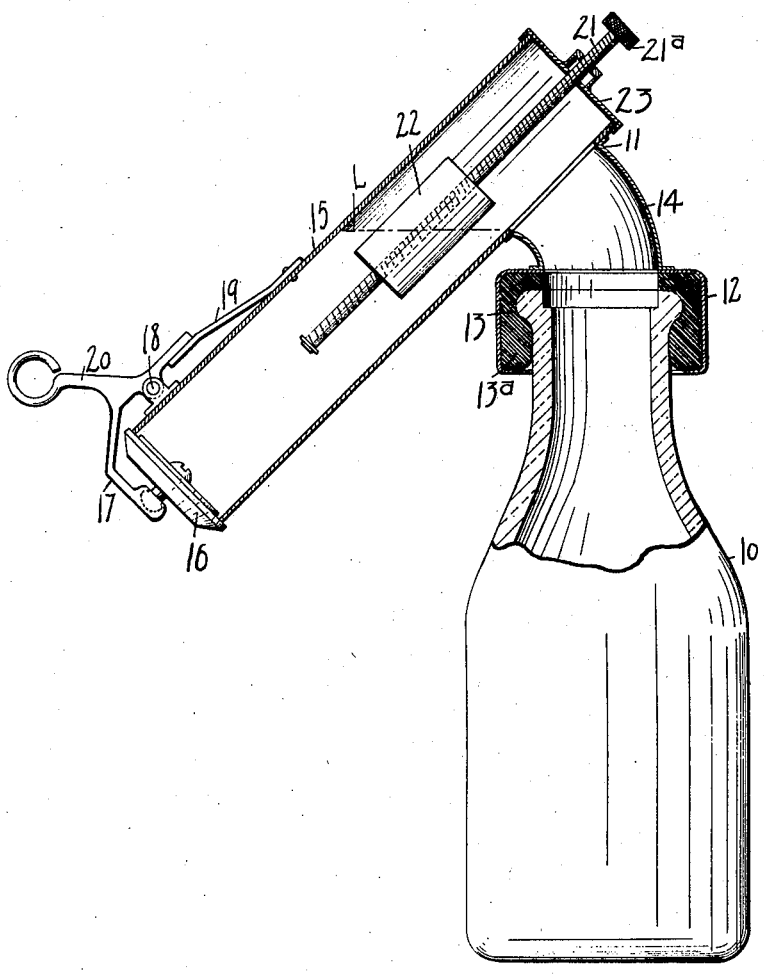
INVENTOR
George W. Perks
BY
Ely & Barrow
ATTORNEYS Patented May 29, 1928.                                          1,671,542

UNITED STATES PATENT OFFICE.

GEORGE W. PERKS, OF AKRON, OHIO.

MEASURING AND DISPENSING ATTACHMENT FOR BOTTLES.

Application filed September 30, 1927. Serial No. 223,026.

This invention relates to measuring attachments for bottles.

In the use of milk in various fountain drinks and in the general dispensing of liquids from bottles, much loss has heretofore resulted, due to the use of a larger quantity of the liquid than is required.

The general purpose of the present invention is to provide a simple, inexpensive, but highly effective, dispensing attachment for use on bottles, such as milk bottles, for measuring and dispensing a predetermined quantity of liquid.

Particularly, the invention has for its object the provision of an attachment adapted to be readily and removably fitted to the mouth of a bottle and providing a dispensing chamber, preferably directed at an angle to the bottle, to be filled by tilting the bottle as if pouring and then returning the bottle to upright position, excess liquid draining back into the bottle. The dispensing chamber is to have a normally closed outlet at the bottom thereof, the outlet having a manually operable closure.

The invention also has for its object the provision of means for varying the quantity of liquid dispensed, including a displacement member arranged in the vessel and means to adjust the displacement member relative to the level to which the liquid drains back into the bottle from the dispensing attachment.

The foregoing and other objects are attained by the provision of the attachment for milk bottles shown in the accompanying drawing and described below. It is to be understood that the invention is not limited to the particular form thereof shown and described.

The accompanying drawing is an elevation partly in section, of a milk bottle having the improved attachment thereon.

Referring to the drawing, the numeral 10 designates a milk bottle and the numeral 11 a dispensing attachment therefor, which has a fitting 12 housing a flexible, resilient socket member 13 of rubber or other suitable material, provided with a portion 13ᵃ adapted to fit under the lip of the bottle, whereby the fitting 12 may be forced onto the mouth of the bottle 10, the portion 13ᵃ of socket member 13 yielding as it passes over the lip of the bottle and engaging under the lip thereof removably to secure the attachment in place and to provide a fluid-tight joint between the attachment and bottle.

Member 12 is connected by a curved duct 14 to an angularly directed vessel 15 extending below the mouth of bottle 10 and having an outlet at its lower end normally closed by a closure 16 supported by a lever 17 pivoted on vessel 15 at 18, a spring 19 acting on the lever 17 to keep the closure 16 shut. An arm 20 is provided on lever 17 for manually opening closure 16 against the action of spring 19.

The top of vessel 15 is closed as by a removable cap 23 threaded thereon and through which is threaded a screw 21 extending downwardly into vessel 15 below the level L, the screw having adjustably mounted thereon a displacement member 22 of cork or other suitable material. Screw 21 has a knurled head 21ᵃ thereon for manipulation thereof.

In use, the bottle 10 is tilted as for pouring, the milk flowing into vessel 15. The bottle is then set or held upright, the milk draining back into bottle 10 to the level L. A predetermined amount of milk, accordingly, remains in vessel 15, the amount of which can be varied by adjustment of member 22 so as to be either wholly above or wholly below level L, or at some intermediate point where it will displace a fraction of its whole volume of milk. The measured quantity of milk is dispensed into a suitable receptacle by opening closure 16 as will be understood.

It has been found in use that the valve 16 is operable by pressure of the hand holding the bottle of milk, enabling quick and effective use of the device at soda fountains, etc.

Modifications of the invention may be resorted to without departing from the spirit thereof or the scope of the appended claims.

What is claimed is:—

1. A liquid measuring and dispensing attachment for bottles comprising a fitting including a resilient socket member adapted to be forced onto the mouth of a bottle removably to secure the attachment on a bottle and to provide a liquid-tight joint between the bottle and the attachment, and a dispensing vessel connected to said fitting by a duct, said vessel being directed at an angle to said bottle, whereby it is adapted to be filled by tilting of the bottle and to drain back into the bottle upon righting of the latter until a predetermined level is reached in the vessel, said vessel having a normally closed closure at the bottom thereof and means for opening said closure, said vessel having a cap on the top thereof and a rod threaded through said cap and adjustably carrying a displacement member within the vessel, said displacement member being adjustable with respect to said level to vary the quantity of liquid which will be dispensed by the attachment.

2. A liquid measuring and dispensing attachment for milk bottles comprising a fitting including a resilient socket member adapted to be forced onto the mouth of a bottle removably to secure the attachment on a bottle and to provide a liquid-tight joint between the bottle and the attachment, a dispensing vessel connected to said fitting by a duct, said vessel being directed at an angle to said bottle below the mouth thereof, whereby it is adapted to be filled by tilting of the bottle and to drain back into the bottle upon righting of the latter until a predetermined level is reached in the vessel, said vessel having a normally closed closure at the bottom thereof and means operable by pressure of the hand in which the bottle is held for opening said closure, and a displacement member adjustable in said vessel with respect to said level to vary the amount of liquid dispensed.

3. A liquid measuring and dispensing attachment for milk bottles comprising a fitting to secure the attachment on a bottle, a dispensing vessel connected to said fitting by a duct, said vessel being directed at an angle to said bottle below the mouth thereof, whereby it is adapted to be filled by tilting of the bottle and to drain back into the bottle upon righting of the latter until a predetermined level is reached in the vessel, said vessel having a normally closed closure at the bottom thereof and means operable by pressure of the hand in which the bottle is held for opening said closure, and a displacement member adjustable in said vessel with respect to said level to vary the amount of liquid dispensed.

4. In combination, a bottle and a liquid measuring and dispensing device mounted on the mouth of the bottle, said device including a vessel having a fitting for the mouth of the bottle and extending below the outlet from the fitting when said bottle is upright so as to be capable of being filled through the fitting by tilting of the bottle and to drain to a predetremined level when said bottle is righted, said vessel having an outlet at the bottom thereof, a closure for said outlet, and means mounted on the vessel and associated with said closure normally urging the closure against the bottom of the vessel to seal said outlet but adapted to be operated by pressure of the hand holding the bottle when the bottle is upright to open the closure to dispense the liquid from said vessel.

5. A device for measuring and dispensing a liquid from a bottle, said device including a vessel having a fitting adapted to be applied to the mouth of the bottle so that the vessel will extend below the outlet from the fitting when the bottle is upright whereby said vessel may be filled to a predetermined level by tilting the bottle and then righting the bottle to permit the liquid to drain from the vessel back into the bottle, said vessel having an outlet in the bottom thereof, a closure for said outlet, and means comprising a lever connected to the closure and pivoted on the vessel, and a spring on the vessel engaged with said lever so as normally to hold the closure shut, but adapted to be operated by force applied by the hand holding the bottle to open said closure to dispense the liquid.

GEORGE W. PERKS.